April 5, 1966  PAUL V. WYSONG, JR  3,244,022

BALL SCREW AND NUT ASSEMBLY

Filed April 20, 1964

INVENTOR.
PAUL V. WYSONG, JR.

BY Lyon & Lyon

ATTORNEYS

United States Patent Office 3,244,022
Patented Apr. 5, 1966

3,244,022
BALL SCREW AND NUT ASSEMBLY
Paul V. Wysong, Jr., Los Angeles, Calif., assignor to Sargent Engineering Corporation, Huntington Park, Calif., a corporation of California
Filed Apr. 20, 1964, Ser. No. 361,172
6 Claims. (Cl. 74—424.8)

This invention relates to ball screw and nut assemblies of the general type shown in the Valenti Patent No. 2,907,223, for Jack Screw Drive. This invention is particularly directed to improvements in the internal construction of the nut, in order to minimize rocking motion of the nut relative to the screw.

In some ball screw and nut installations, it is important that the over-all length of the nut be maintained at a minimum, in order to obtain maximum travel with a minimum over-all length of the assembly. However, when the nut is short, and particularly when it is subjected to side loads, it may develop objectionable rocking movement with respect to the screw.

It is the principal object of the present invention to provide a ball screw and nut assembly having provision for eliminating or at least minimizing such rocking motion, even though the nut be short and even though it may be subjected to side loads.

Another object is to provide a ball screw and nut assembly in which the ball-receiving grooves in the nut merge into internal recesses at each end of the nut, so that axial loads are carried by the grooves and radial loads are carried by walls of the recesses.

Another object is to provide such a device in which the outer walls of the recesses are cylindrical and have radial contact with the balls.

Other and more detailed objects and advantages will appear hereinafter.

Figure 1:
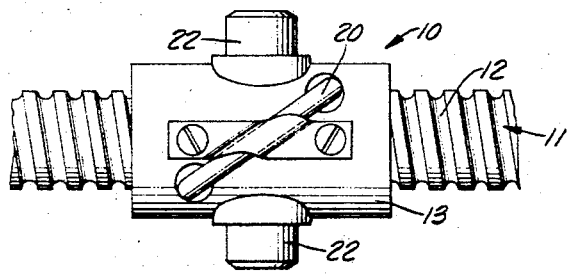
FIGURE 1 is a side elevation partly broken away showing a ball screw and nut assembly embodying this invention.
Figure 2:
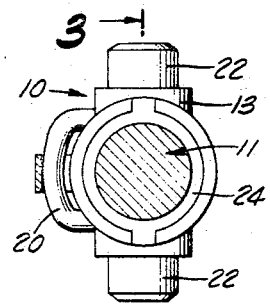
FIGURE 2 is an end view partly in section.
Figure 3:
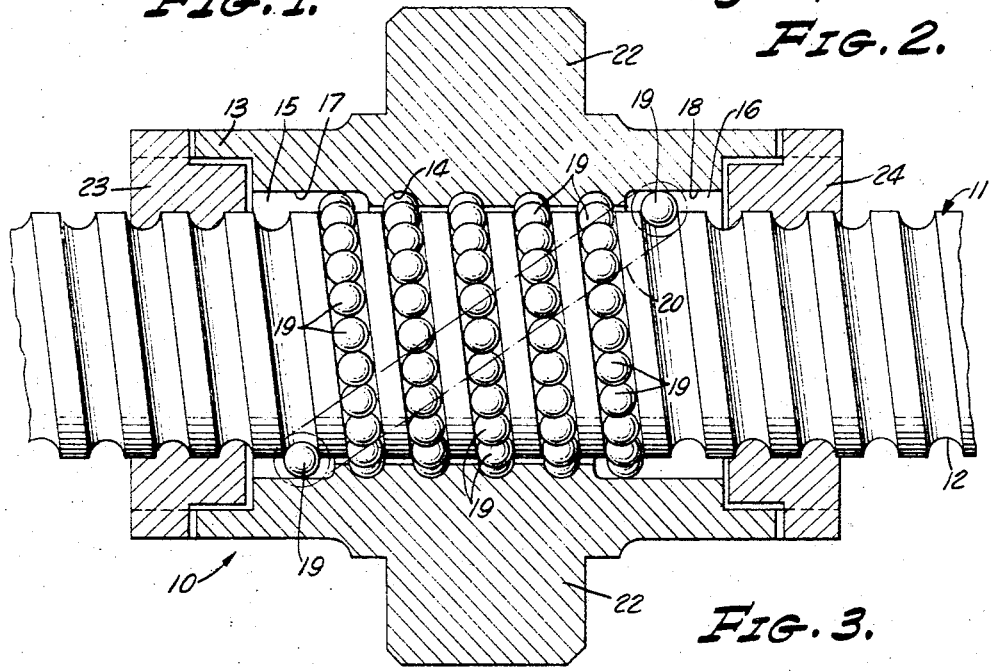
FIGURE 3 is a sectional elevation taken substantially on the lines 3—3 as shown in FIGURE 2.

Referring to the drawings, the ball screw and nut assembly generally designated 10 includes a screw 11 having a continuous external helical groove 12. The nut 13 encircles a portion of the screw 11 and is provided with a continuous internal groove 14. Recesses 15 and 16 are provided at each end of the nut 13, and the groove 14 extends between these recesses. Cylindrical walls 17 and 18 form the outer boundaries of the recesses 15 and 16, respectively, and these walls have radial contact with the balls 19 which are mounted in the grooves 12 and 14.

A ball return 20 of conventional construction is mounted on the nut 13 and communicates with the recesses 15 and 16.

Figure 4:
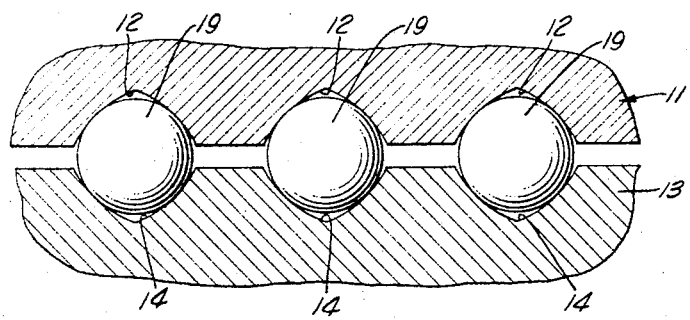
FIGURE 4 is a fragmentary sectional view showing a portion of FIGURE 3 on an enlarged scale and illustrating the "gothic arch" form of the ball-receiving grooves on the screw and nut.

As shown in the enlargement of FIGURE 4, the axial cross-section shape of the grooves 12 and 14 takes the form of a "gothic arch" so that the balls 19 contact the flanks of the grooves in order to carry axial loads. However, the cylindrical walls 17 and 18 have only radial contact with the balls 19 and therefore carry only radial loads. In this way, the balls 19 which are adjacent the opposite ends of the nut 13 carry the radial loads and hence serve to minimize the rocking of the nut 13 with respect to the screw 11.

Oppositely extending trunnions 22 are provided on the nut for reception of a yoke, not shown, through which forces may be applied to the nut 13. These forces may be either axial or radial, or a combination of both. Conventional wipers 23 and 24 may be mounted on the nut 13 at opposite ends thereof for engagement with the groove 12 on the screw 11.

Having fully described my invention, it is to be understood that I am not to be limited to the details herein set forth, but that my invention is of the full scope of the appended claims.

I claim:

1. In a ball screw and nut assembly, the combination of: a screw having an external ball-receiving groove, a nut having an internal recess at each end and having an internal ball-receiving groove extending between the recesses, a plurality of balls in said grooves interposed between said screw and said nut, each of said grooves being shaped for contact with the balls only upon flanks of the grooves to carry axial loads, each recess having a surface providing radial contact with the balls to carry radial loads, whereby rocking movement of the nut relative to the screw is minimized.

2. In a ball screw and nut assembly, the combination of: a screw having an external ball-receiving groove, a nut having an internal recess at each end and having an internal ball-receiving groove extending between the recesses, a plurality of balls in said grooves interposed between said screw and said nut, each of said grooves being shaped for contact with the balls only upon flanks of the grooves to carry axial loads, each recess having an axially extending cylindrical outer wall having radial contact with the balls to carry only radial loads, whereby rocking movement of the nut relative to the screw is minimized.

3. In a ball screw and nut assembly, the combination of: a screw having an external ball-receiving groove, a nut having an internal recess at each end and having an internal ball-receiving groove extending between the recesses, a plurality of balls in said grooves interposed between said screw and said nut, each of said grooves being shaped as a gothic arch in axial cross-section for contact with the balls only upon flanks of the grooves to carry axial loads, each recess having an axially extending cylindrical outer wall having radial contact with the balls to carry only radial loads, whereby rocking movement of the nut relative to the screw is minimized.

4. A ball screw nut having an internal recess at each end and having a helical ball-receiving groove extending between the recesses, said groove being shaped for contact with balls only upon flanks of the groove to carry axial loads, each of said recesses having a surface providing radial contact with the balls to carry radial loads.

5. A ball screw nut having an internal recess at each end and having a helical ball-receiving groove extending between the recesses, said groove being shaped for contact with balls only upon flanks of the groove to carry axial loads, each of said recesses having an axially extending cylindrical outer wall for radial contact with the balls to carry radial loads.

6. A ball screw nut having an internal recess at each end and having a helical ball-receiving groove extending between the recesses, said groove being shaped as a gothic arch in axial cross-section for contact with balls only upon flanks of the groove to carry axial loads, each of said recesses having an axially extending cylindrical outer wall for radial contact with the balls to carry radial loads.

References Cited by the Examiner
UNITED STATES PATENTS

| | | | |
|---|---|---|---|
| 2,455,368 | 12/1948 | Hoffar | 74—459 |
| 2,502,066 | 3/1950 | Tanner | 74—459 |
| 3,009,367 | 11/1961 | Striggow | 74—459 |

DAVID J. WILLIAMOWSKY, *Primary Examiner.*

L. H. GERIN, *Assistant Examiner.*